Feb. 22, 1955   E. D. BUSCH   2,702,564
CONDUIT SECTION
Filed July 18, 1951

INVENTOR.
Edward D. Busch
BY Dybvig & Dybvig
His Attorneys

United States Patent Office 2,702,564
Patented Feb. 22, 1955

2,702,564

CONDUIT SECTION

Edward D. Busch, Dayton, Ohio

Application July 18, 1951, Serial No. 237,460

3 Claims. (Cl. 138—48)

This invention relates to a combined hot air and radiant heating system and more particularly to the hot air and radiant heating conduits.

In the use of heating systems using hot air conduits for hot air passages and at the same time for radiant heating, the hot air ducts or conduits are embedded in concrete or similar material. The conduits have usually been made from light weight sheet metal. The concrete, or the equivalent thereof, is then laid in two layers, the lower layer embedding the lower half of the conduits and the upper layer covering the conduits. This presents a number of problems. In trying to hold the conduits down, the pressure of the concrete on the lower half tends to cause the conduits to raise or float and if they are held down, there is a tendency to collapse the conduits. Difficulty is encountered in anchoring the conduits so that they will not float. Also, difficulty is encountered in making the concrete flow under the conduits properly, so as to provide a solid base for the conduits.

An object of this invention is to provide a conduit such that it is not necessary to use two layers of concrete, thereby reducing the cost of building and at the same time producing a better and more dependable conduit for conducting the hot air.

Another object of this invention is to provide a conduit, one-half of which is molded from concrete or similar initially plastic material, the other half being made from semi-cylindrical sheet metal.

Another object of this invention is to provide a conduit such that the lower half may be laid on the base without the use of concrete as a support therefor.

Another object of this invention is to provide a conduit that is economical, easily laid in position and at the same time strong, dependable and sturdy.

Other objects and advantages reside in the construction of parts, the combination thereof and the mode of operation, as will become more apparent from the following description.

Figure 1:
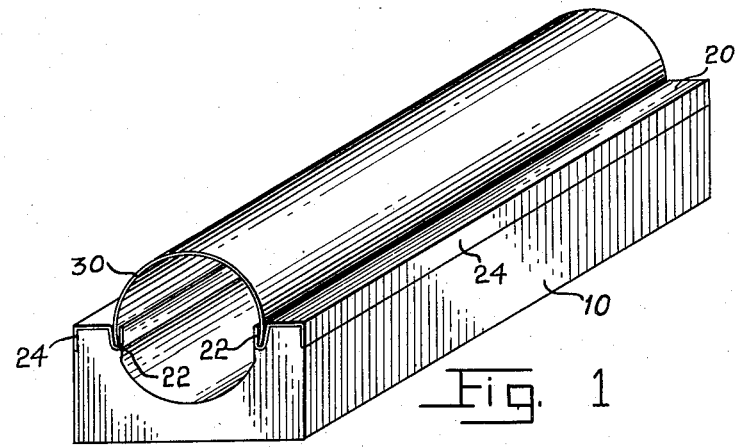
Figure 1 is a perspective view of a section of a conduit.
Figure 2:
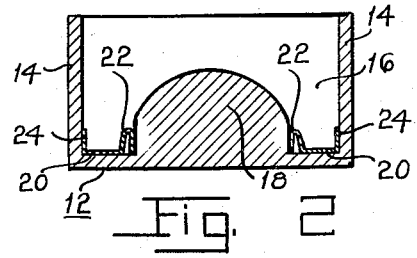
Figure 2 is an end cross sectional view of the mold used in forming the conduit, the mold having positioned therein the sheet metal retaining members.

Referring to the drawings, the reference character 10 indicates a base or the lower half of the conduit made from concrete or "Perlite" in combination with sand and cement. The base member 10 is made in a mold 12 having side walls 14, end walls 16, only one of which has been shown, and an arcuate base 18. Before the initially plastic material is poured into the mold, whether this initially plastic material be concrete or "Perlite" mixed with sand and cement, or some other initially plastic material, a pair of metallic sheet metal retaining members 20 are positioned in the bottom of the mold. Each of these metallic retaining members is provided with an inverted V-shaped notch or groove 22 and a laterally disposed flange 24. After members 20 have been positioned in the bottom of the mold, the initially plastic aggregate is poured into the mold and permitted to set. This molded section forms the lower half of the conduit. The retaining members 20 form a part of the molded section, so that as the molded section is removed from the mold, the retaining members 20 are also removed. As clearly seen in Figures 1, 2, 5 and 6, the metal on one side of the V-groove 22 forms a continuation of the semi-cylindrical recess of the base member 10. The V-shaped groove 22 forms a seat for the upper half of the conduit, which will now be described.

The upper half of the conduit consists of a semi-cylindrical sheet metal shell 30 having the lateral edges seated in the V-shaped grooves 22. The conduit section may be laid in position upon insulating material 32, shown in Figure 5, which insulation may be laid directly on top of gravel 34. If the conduit is located along an outer wall, it is preferably separated from the outer wall 38 by a sheet of insulation 36. This insulation may be fiber glass or any other insulating material that is adaptable for this use.

Figure 5:
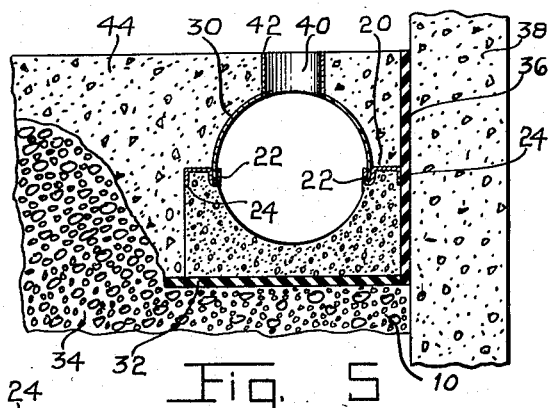
Figure 5 is an end view, partly shown in section, illustrating the use of the conduit as it appears embedded in concrete.
Figure 3:
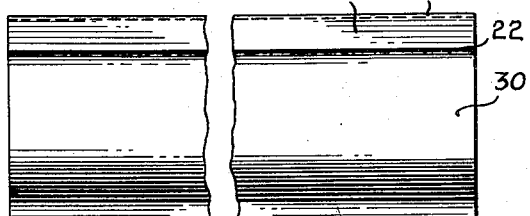
Figure 3 is a top plan view of the conduit unit shown in Figure 1.
Figure 6:
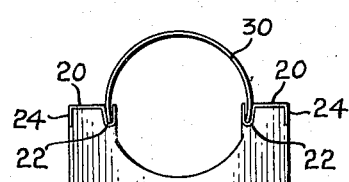
Figure 6 is an end elevational view of the section of the conduit shown in Figure 1.
Figure 4:
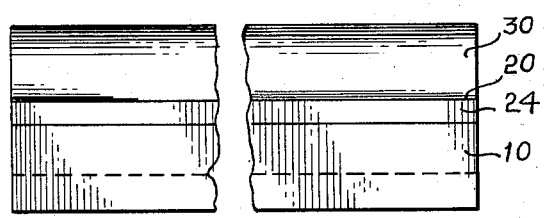
Figure 4 is a side elevational view thereof.

At intervals it is necessary to provide outlet passages for the hot air. In Figure 5 an outlet passage 40 has been shown, which has been produced by providing a tubular member 42 positioned on top of the shell 30 and held in this position while pouring the concrete 44. After the concrete 44 has been poured and set, an opening is cut in the shell 30 registering with the tubular passage or duct 40. If this shell 30 is made from sheet metal, it may possibly be left in position. However, it need not necessarily be made from sheet metal. It may be made from fibrous material or any other suitable material, in which event it may be removed, if desired.

These sections are laid end to end, so as to form a conduit. They are laid directly on the base for the concrete, usually gravel. In order to preserve heat, insulation is placed between the section of the conduit and the underlying gravel. These conduit sections may be made in suitable lengths, as for example, lengths of two feet, so that they are easily manipulated, laid end to end, and then when laid in position, the concrete is poured on top of the conduits so as to provide a floor that is heated, providing a radiating surface and in addition thereto, the room is heated by the hot air escaping through the outlet ducts 40.

"Concrete," as used herein, designates any suitable material that is initially plastic, so that it may be molded into shape.

Although the preferred embodiment discloses a conduit that is round, which is the preferable shape, the conduit need not necessarily be round. It may have any other suitable cross sectional area, depending in part upon the use to which it is to be put, the space available, et cetera. For example, it may be rectangular, square or oval. The shape is governed by various factors which need not be discussed at this time.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A conduit section for use in a hot air heating system having conduits embedded in concrete, said conduit section including a concrete block having a substantially semi-cylindrical recess traversing the top thereof, said concrete block having a pair of horizontally disposed areas, one on each side of the semi-cylindrical recess, a pair of sheet metal channel members positioned in overlapping relation to the horizontally disposed areas, each of said sheet metal members having a V-shaped groove contiguous to the semi-cylindrical recess, the metal on one side of said V-shaped groove forming a continuation of the surface of the semi-cylindrical recess, and a substantially semi-cylindrical sheet metal member cooperating with the semi-cylindrical recess to form a cylindrical conduit, the margins of the semi-cylindrical sheet metal member being positioned in the V-shaped grooves so as to prevent displacement thereof while pouring the concrete over the conduit section.

2. A conduit section according to claim 1, wherein the lengths of the concrete block, the sheet metal channel members, and the semi-cylindrical sheet metal member are of equal length and terminate in the same planes.

3. A conduit consisting of a plurality of conduit sections aligned end to end for use in a hot air heating system wherein the conduit sections are embedded in concrete, each of said conduit sections including a concrete block having a substantially semi-cylindrical recess extending across the top thereof, the recesses of the several blocks being aligned so as to form a continuous semi-cylindrical recess, each of said concrete blocks having a pair of horizontally disposed areas, one on each side of the cylindrical recess, a pair of sheet metal members positioned in overlapping relation to the horizontally disposed areas, each of said sheet metal members having a V-shaped groove contiguous to the semi-cylindrical recess, each of said sections including a substantially inverted semi-cylindrical sheet metal member overlying the cylindrical recess, the semi-cylindrical sheet metal members cooperating with adjacent semi-cylindrical sheet metal members and the V-shaped grooves to form a continuous cylindrical conduit, the margins of the semi-cylindrical sheet metal members being positioned in the V-shaped grooves so as to prevent displacement of the semi-cylindrical sheet metal members when the concrete is poured over the conduit sections.

References Cited in the file of this patent

UNITED STATES PATENTS

| | | |
|---|---|---|
| 1,168,400 | Kenway | Jan. 18, 1916 |
| 1,184,472 | Medway | May 23, 1916 |
| 1,611,438 | Hauser | Dec. 21, 1926 |
| 1,758,989 | Walker | May 20, 1930 |
| 1,776,195 | Robinson | Sept. 16, 1930 |
| 1,986,874 | Arnold | Jan. 8, 1935 |